United States Patent [19]

Jack et al.

[11] 3,991,166

[45] Nov. 9, 1976

[54] CERAMIC MATERIALS

[75] Inventors: Kenneth Henderson Jack, Cullercoats; William Ian Wilson, Durham, both of England

[73] Assignee: Joseph Lucas (Industries) Limited, Birmingham, England

[22] Filed: Apr. 8, 1975

[21] Appl. No.: 566,605

Related U.S. Application Data

[63] Continuation of Ser. No. 322,778, Jan. 11, 1973, abandoned.

[30] Foreign Application Priority Data

| Jan. 11, 1972 | United Kingdom | 1255/72 |
| Jan. 11, 1972 | United Kingdom | 1256/72 |
| Jan. 11, 1972 | United Kingdom | 1257/72 |
| Jan. 11, 1972 | United Kingdom | 1258/72 |
| Jan. 15, 1972 | United Kingdom | 2014/72 |
| July 4, 1972 | United Kingdom | 31210/72 |

[52] U.S. Cl. .............................. 423/327; 106/59.7; 106/65; 106/73.4; 106/73.5; 264/56; 264/65; 264/66; 264/332

[51] Int. Cl.² ................... C01B 33/26; C04B 35/64

[58] Field of Search ............... 264/56, 65, 66, 332; 106/39.7, 65, 73.4, 73.5; 423/327

[56] References Cited

UNITED STATES PATENTS

| 3,591,337 | 7/1971 | Lumbey | 264/65 X |
| 3,717,694 | 2/1973 | Mt. Pleasant | 264/338 |

OTHER PUBLICATIONS

Japan, J. Appl. Phys. 10 (1971) 1637, (Oyama et al.).
Japan, J. Appl. Phys. 11 (1972) pp. 760–761, (Oyama).

*Primary Examiner*—Robert F. White
*Assistant Examiner*—Thomas P. Pavelko
*Attorney, Agent, or Firm*—Holman & Stern

[57] ABSTRACT

A ceramic material includes at least 90% of a single phase silicon aluminum oxynitrite having the general formula:

$$-Si_{6-z} Al_z N_{8-z} O_z -$$

where z is greater than 0 and less than or equal to 5.

One method of producing the ceramic material involves sintering a mixture including not more than 75% by weight of high active surface area alumina powder of particle size less than 10 microns and silicon nitride powder of particle size less than 20 microns.

In another method of producing the ceramic material, a mixture of silicon and alumina powders of particle size less than 20 microns is nitrided at a temperature between 1250° C and 1600° C. The proportions of silicon and alumina in the mixture being nitrided are such that the atomic ratio of silicon to aluminium is not less than 1:3.

27 Claims, 1 Drawing Figure

UNIT CELL DIMENSIONS β- SILICON ALUMINUM OXYNITRIDE

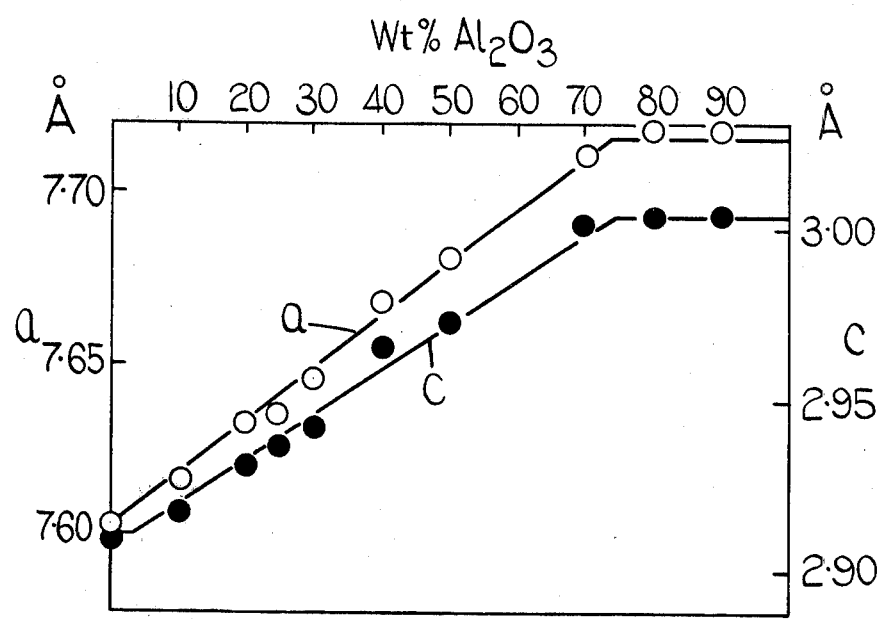
UNIT CELL DIMENSIONS β- SILICON ALUMINUM OXYNITRIDE

CERAMIC MATERIALS

This is a continuation of application Ser. No. 322,778, filed Jan. 11, 1973, now abandoned.

This invention relates to ceramic materials.

In one aspect, the invention resides in a ceramic material including at least 90% of a single phase silicon aluminum oxynitrite having the general formula $$- Si_{6-z} Al_z N_{8-z} O_z -$$ 

where $z$ is greater than 0 and less than or equal to 5.

In a further aspect the invention resides in a method of producing a ceramic material comprising mixing not more than 75% by weight of high active surface area alumina in powder form of particle size less than 10 microns, or a compound of aluminium which decomposes to give the required alumina at the elevated temperature of the process, with powdered silicon nitride of particle size less than 20 microns and sintering the mixture to form a ceramic material containing at least 90% of a single phase silicon aluminum oxynitride of the above general formula.

Preferably the sintering operation is accompanied by pressure.

Alternatively the sintering operation is performed in the absence of pressure.

Preferably the sintering time is at least 30 minutes.

Preferably the starting materials are surrounded by a protecting medium while at elevated temperature, such as powdered boron nitride.

Preferably the silicon nitride powder is less than 5 microns particle size.

Preferably the alumina powder is less than 1 micron particle size.

More preferably the alumina is 0.5 microns particle size.

In yet a further aspect, the invention resides in a method of producing a ceramic material of the kind described above, comprising nitriding silicon powder in the presence of alumina powder, the powders having a particle size less than 20 microns, the atomic ratio of silicon to aluminium being greater than or equal to 1 : 3 and the nitriding temperature being between 1250° C and 1600° C.

Preferably, where the atomic ratio of silicon to aluminium is less than 3 : 1, the method includes the further step of raising the temperature to a value in excess of 1600° C.

Conveniently, the further heating step is also conducted in a nitriding atmosphere.

Alternatively, the further heating step is conducted in a separate furnace within a protective medium, such as boron nitride powder.

Preferably, the further heating step is conducted at at least 1700° C, preferably 1900° C and more preferably 2000° C.

Preferably, the starting materials are less than 5 microns particle size, and more preferably less than 1 micron particle size.

Conveniently the components are cold pressed to shape prior to nitriding.

The accompanying drawing is a graph showing the change in the a and c unit cell dimensions of a ceramic material produced by a method according to one example of the invention as the alumina content in the starting materials is increased.

In a first example of the invention, silicon nitride powder consisting of at least 85% of the α-phase material was mixed with high purity α-alumina powder having a mean particle size of less than 1 micron and a high surface area and reactivity so that the mixture contained 27.5% by weight of the alumina. The mixing operation was effected by wet ball milling the powders in iso-propyl alcohol for 72 hours until the average particle size of the mixture was 5 microns. The mixture was then dried and placed in a steel die between steel punches, and pressed at room temperature at 2000 lbs/square inch to form a self-supporting pre-form of approximately ¾ in. diameter by ¾ in. in length. The preform was then transferred to a graphite hot pressing tool comprising a die with a 1 inch diameter bore, a plug and a punch, all surfaces presented to the die cavity having been sprayed with boron nitride powder to a depth of 0.002 to 0.005 ins. Before inserting the preform into the cavity a ¾ in. layer of fine boron nitride powder was poured into the cavity onto the plug, and the preform was placed in the center of the cavity and pushed into the bed of powder so that the powder rose into the annular space between the preform and the die walls. More fine boron nitride powder was then poured onto the preform until the layer was approximately ¾ in. above the top of the preform. The graphite punch was then assembled into the die cavity and onto the bed of boron nitride powder, and pushed to compact the powder. By this means the preform was embedded in a compacted protective environment during the subsequent hot-pressing operation. The boron nitride used in the example was hexagonal powder sold by New Metals and Chemicals Limited, having a particle size of the order of 5 microns and termed Grade FL/T. The mixture was then pressed at 2.5 tons/square inch at a temperature of 1700° C for 1 hour, the temperature being raised from room temperature to the hot pressing temperature over a period of 20 minutes while the pressure was raised from an initial 500 lbs/square inch at room temperature to full pressure at approximately 1500° C. The product was allowed to cool in the dies while under pressure. The resultant product was subjected to X-ray analysis using monochromatic CuKα (Hägg-Guinier focusing camera, KCl standard) and was found to consist predominantly of a single phase ceramic material having a crystal structure based upon that of β-phase silicon nitride, but having increased cell dimensions, there also being present a small percentage, less than 5%, of an unidentified phase. The single phase ceramic material was a silicon aluminium oxynitride corresponding to the above general formula.

The above example was then repeated at other pressing temperatures within the range 1600° C to 2000° C, the pressing at 2000° C being maintained at full pressure and temperature for ½ hour. X-ray analysis of the resultant products showed that, while pressings performed at the lower temperatures gave products which contained a small percentage of an unidentified phase in addition to the single phase ceramic material defined above, the unidentified phase was absent from the X-ray traces of products obtained from pressings performed at the upper temperatures, nearer to 2000° C. Two samples were pressed at 1800° C, one for 1 hour at temperature as in the first example, the other for 3 hours at temperature, without any difference being observed in the resultant products.

Further work performed on time at temperature showed that at the lower temperatures 1600° C to 1700° C, incomplete reaction occurred if the time under pressure was below approximately 30 minutes, consequently at the lower temperatures it proved preferable to maintain at temperature for at least 1 hour, while at the upper temperatures 1900° C to 2000° C, complete reaction had taken place by maintaining under pressure for approximately 30 minutes.

By way of comparison, the procedure of the first example was repeated, but with the hot pressing temperature being below 1600° C. In this case, the reaction between the silicon nitride and alumina to produce the single phase ceramic material defined above was found to be incomplete such that it was not found to be possible to produce more than 90% of the single phase ceramic material even after prolonged heating under pressure and, for example, when the hot pressing temperature was 1500° C, the product contained only about 40% of said material.

In a second example of the invention, a similar mixture to that of the first example was prepared, but in this case the mixture was arranged to contain 50% by weight of alumina. Samples of this mixture were then hot pressed, by the method of the first example, at varying temperatures within the range 1600° to 2000° C and the resultant hot pressed products were subjected to X-ray analysis. It was found that the products resulting from pressing at the lower temperatures consisted of at least 90% by volume of the single phase silicon aluminum oxynitride, but also contained a small percentage of an unidentified phase. However, as in the preceding example, it was found that the unidentified phase was absent from the X-ray traces of the products obtained at the upper pressing temperatures, in the order of 2000° C, these products being 100% single phase homogeneous silicon aluminum oxynitride.

In a third example, the procedure of the second example was repeated, but with the silicon nitride/alumina mixture being arranged to contain 70% by weight of alumina. In this case, X-ray analysis of the resultant products showed that, with the hot pressing temperatures being in the lower part of the range, the resultant products consisted predominantly of this single phase silicon aluminum oxynitride, but also contained some free alumina and a small percentage of an unidentified phase. However, as the hot pressing temperatures approached 2000° C, it was found that the resultant products contained no free alumina and the unidentified phase was absent from the X-ray traces. The resultant products were 100% single phase homogeneous silicon aluminum oxynitride.

In a fourth example, the method of the third example was repeated with a silicon nitride/alumina mix containing 75% by weight of alumina and hot pressed at 2000° C for ½ hour. The resultant product contained more than 90% by volume of a single phase homogeneous silicon aluminum oxynitride, about 5% alumina and a trace of an unidentified phase.

By way of comparison, the method of the fourth example was repeated with silicon nitride/alumina mixes containing more than 75% by weight of alumina. However, it was found that even when hot pressing was performed at 2000° C the resultant product contained some free alumina in addition to the substantially single phase silicon aluminum oxynitride, said single phase material occupying less than 90% of the ceramic phase.

In a fifth example of the invention, the procedure of the first example was followed with a silicon nitride/alumina mix containing 20% by weight of alumina and hot pressed as before at varying temperatures within the range 1600° C to 2000° C, with hold times of 1 hour for all except the 2000° C pressing which was held for ½ hour. The resultant products contained the single phase silicon aluminum oxynitride together with 10% unidentified phase for the pressing at 1600° C, the quantity of unidentified phase reducing with increasing pressing temperature until samples pressed in the region of 2000° C contained no unidentified phase and were 100% homogeneous single phase material.

In a sixth example of the invention, the procedure of the fifth example was repeated with the starting mixture containing 10% by weight of alumina. The same pattern of resultant products as in the fifth example was obtained.

Similarly in a seventh example using a 2% by weight of alumina mix, products included at least 90% of the single phase silicon aluminum oxynitride.

In all the examples quoted above the bulk density of the products obtained was of the order of 3.04 g/cc.

While in the examples given, high α-phase silicon nitride was used, some examples were repeated with a low composition and little difference was observed in the comparable products.

The high active surface area alumina used in most of the examples was high purity α-alumina supplied by La Pierre Synthetique Baikowski, France, known as type GE 30 of mean particle size 0.5 microns with a surface area greater than 1 sq.m/gm. However, alumina supplied by the Aluminium Company of America, types XA16 and XA17 was also used successfully. Also alumina supplied by Degussa and termed gamma-alumina was used successfully.

While in all the examples given alumina has been one of the starting materials it will be appreciated that compounds of aluminium which decompose to give alumina at the hot pressing temperature could be used for example aluminium hydroxide and aluminium nitrate. For example, 7 gms of the silicon nitride of the previous examples was added to a solution of 42 gms. of aluminium sulphate in 75 mls. of water. To this mixture, 22.5 mls. of ammonium hydroxide (0.880) was added and mixed for 18 hours. After decanting and washing, the precipitate was dried and hot pressed in the normal way at 1700° C for 1 hour to produce a 95% silicon aluminium oxynitride together with 5% of an unidentified phase.

It will be observed from the above seven examples that, as the alumina content is increased the silicon in the tetrahedral framework of silicon nitride has been partly replaced by aluminium while simultaneous replacement of nitrogen by oxygen has occurred. Above approximately 75 weight % alumina content it was observed that, while the β-structure was retained, the unit cell dimensions were substantially constant and some free alumina remained. The graph shown in the drawing demonstrates the cell dimensional change with increasing alumina content.

In all the examples the surfaces of the hot pressed product were found to have an adherent boron nitride layer which was removed in subsequent shaping operations.

In producing a substantially single phase silicon aluminum oxynitride as defined above, it is desirable to ensure that the hot pressing temperature is greater than 1600° C, or more preferably greater than 1700° C. Also, where a 100% single phase product is required, then it is desirable that the hot pressing temperature should be greater than 1900° C and more preferably be of the order of 2000° C. It will, however, be appreciated that the upper temperature limit is governed by parameters such as the dissociation temperature of the ceramic product and the strength of the hot pressing tools.

Also, the time for which the pressure at maximum temperature is maintained should preferably be greater than 30 minutes, and its upper level will obviously be determined by economics and/or degradation of the sample.

It will be noted in the examples given, the silicon nitride/alumina mixtures were protected within the graphite dies during the hot pressing, by embedding the mixtures in boron nitride powder, in addition to the conventional spray coating of the tools with boron nitride. Otherwise, it was found, at the upper hot pressing temperatures, above 1800° C, some difficulty was experienced in removing the hot pressed samples from the tools and in some instances some degradation of the surface of the sample occurred. However, the additional protection afforded by embedding the samples in boron nitride powder alleviated this difficulty. However, it will be appreciated that at the lower hot pressing temperatures, below 1800° C, the conventional spray coating of boron nitride on the tools provides satisfactory protection.

It will be appreciated in the examples given that, whilst the silicon nitride/alumina mixes were introduced into the die cavities as preforms, by arranging the boron nitride powder as preforms, the mixes could be introduced in powder form.

In an eighth example of the invention, 14 grams of the silicon nitride powder of the earlier examples was mixed with 13.6 grams of high purity α-alumina powder having a mean particle size of less than 1 micron and a high surface area and reactivity, as sold by La Pierre Synthetique Baikowski, France, and 0.14 grams of ammonium alginate powder. To the dry intimate mix was added 36 ml. of water and the mixture was then mixed on a roller mill for 1 hour and allowed to stand. The mixture thus obtained was of slip-casting consistency and was slip cast in a plaster-of-Paris mould into the shape of a crucible. The slip was dried, removed from the mould and placed in a graphite reaction tube which was lined with an alumina tube one end of the alumina tube being closed by a pressed plug of alumina powder. The alumina tube was then half filled with the fine hexagonal boron nitride powder used in the earlier examples, whereafter the crucible was placed on the boron nitride powder away from the alumina tube walls, and more boron nitride powder was poured over the crucible until it was completely buried. The other end of the alumina was then closed with a further pressed plug of alumina powder and the assembly was heated at a rate of 90° C per minute to 1700° C and held for 1 hour. After 1 hour at the sintering temperature the tube was allowed to cool, and the resultant product was found by X-ray analysis to consist predominantly (90%) of a single phase silicon aluminum oxynitride.

The crucible as produced by the above method was found to have some adherent boron nitride when removed from the surrounding boron nitride protective medium which was removed by sand-blasting.

In a ninth example of the invention, silicon nitride powder consisting of at least 85% of the α-phase material was mixed with high purity α-alumina powder having a mean particle size of less than 1 micron and a high surface area and reactivity. The mixing operation was performed by wet ball milling the powders in iso-propyl alcohol for 72 hours until the average particle size of the mixture was 5 microns, the final mixture being arranged so that the atomic ratio of silicon to aluminium in the mixture was 9 : 1. When the wet ball milling operation was complete, the mixture was dried and a 100 gram sample was placed in a steel die and compacted to form a self-supporting preform at a pressure of 2000 lbs/square inch. The preform was then removed from the steel die and placed within boron nitride powder in a graphite die lined within an alumina tube as in the first example. The assembly was then heated over a period of 20 minutes to the required sintering temperature, which in this case was 1700° C. After 1 hour at the sintering temperature, the tube was allowed to cool and the resulting product was found, by X-ray analysis, to consist predominantly of a single phase ceramic material having a crystal structure based upon that of β-phase silicon nitride, but of increased cell dimensions, the product also containing a small amount, less than 5%, of an unidentified phase. The ceramic material was found to be a silicon aluminum oxynitride.

The above example was then repeated at other temperatures within the range 1600° C to 2000° C. It was observed that, while products produced at the lower temperatures within the range contained a small percentage of an unidentified phase, in addition to the single phase silicon aluminum oxynitride, the unidentified phase was absent from the X-ray traces of products obtained at the upper temperatures, that is nearer 2000° C, these products consisting entirely of the single phase material defined above.

By way of comparison, the procedure of the ninth example was repeated, but the sintering temperature was now held below 1600° C. In this case, the reaction to produce the single phase ceramic material defined above was found to be incomplete and, for example, when the sintering temperature was 1500° C, the product only contained 40% of said material.

In the tenth to fifteenth examples of the invention, the silicon nitride and alumina powders of the first example were used to produce mixtures which contained 20, 25, 40, 50, 60 and 70% by weight of alumina respectively. In each case, subsequent treatment of the mixture followed the procedure of the first example and the sintering operation was carried out at various temperatures between 1700° C and 2000° C. It was found that where the sintering reaction was performed at the lower temperatures in the range, each of the resulting products was found to consist predominantly of the single phase silicon aluminum oxynitride, and was also found to contain a small percentage, less than 5%, of an unidentified phase. In addition, some free alumina was found to be present in the products formed from the 60% and 70% by weight of alumina mixtures. Where the sintering reaction was carried out at the higher temperatures in the range, that is nearer 2000° C, it was found that the unidentified phase, as well as any free alumina, were absent from each of the products and that each of the products consisted entirely of the single silicon aluminum oxynitride.

Investigations were also carried out on mixtures which contained above 75% by weight of alumina, but these were found to contain more than 10% free alumina even when sintered at 2000° C.

It will be appreciated, examples eight to fifteen differ from the earlier examples in that the sintering operation is not accompanied by pressure. However, while the resultant products have lower bulk density figures of the order 2.7 gms/cc, it is found that similar deductions to those of the examples one to nine may be made in respect of control parameters to ensure a product containing at least 90% by volume of the silicon aluminum oxynitride as defined above is obtained. Thus, it is desirable to ensure that the sintering temperature is greater than 1600° C, or more preferably greater than 1700° C. Where a 100% single phase product is required, it is desirable to ensure that the sintering temperature is greater than 1900° C or is more preferably of the order of 2000° C. It will of course be appreciated that the upper temperature limit is governed by parameters such as the dissociation temperature of the ceramic products and the strength of the tools.

It will also be noted that in examples eight to 15 the samples were embedded in boron nitride powder during sintering, as was of course the case with the earlier examples. It was found that without this protecting medium, degradation of the surface of the samples occurred, which was especially pronounced at the upper temperatures, above 1800° C, such that above 1900° C the sample could not be tested. However, embedding the samples in boron nitride powder alleviated this difficulty. However, it will be appreciated that at sintering temperatures of the order of 1700° C such coatings are not necessary but would obviously be preferred if large complex shapes are being sintered.

While boron nitride is preferred as the protecting medium it will be appreciated that mixes including boron nitride could be employed, as could other protecting means such as gaseous media, for example nitrogen adjusted to appropriate partial pressure. Obviously, it is more convenient when choosing a powdered protecting medium to choose one which does not sinter at the hot pressing temperature of the process. Any adherent protective medium to the hot pressed component is easily removed, such as by grinding, sand blasting etc.

In a sixteenth example of the invention, fine silicon powder, as sold by Murex Limited under the trade name Superfine, and having a mean particle size of 3 microns was wet mixed in iso-propyl alchohol with high purity alumina powder having a mean particle size of less than 1 micron and a high surface area and reactivity. The mixture was produced so that the atomic ratio of silicon to aluminum was 3 : 1 and, when mixing was complete, the iso-propyl alcohol was removed and the resulting powder mixture passed through a 60 mesh sieve. Twenty grams of the sieved mixture was then introduced into a rectangular, silicon nitride boat of length 3 inches and width 2 inches and the powder was tapped to compress is slightly. The boat was then placed in an alumina reaction tube, which was subsequently evacuated and re-filled with forming gas until the gas pressure within the tube was approximately that of ambient atmospheric pressure. The temperature within the reaction tube was then raised over a period of 8 hours to the required nitriding temperature, which in this example was 1400° C, and was retained at this temperature for six hours, forming gas being allowed to pass through the reaction tube at a rate of half liter/minute throughout the heating operation. The reaction tube was then allowed to cool over a period of 8 hours and, on removal from the tube the resultant product was found, by X-ray analysis, to consist predominantly of a single phase silicon aluminum oxynitride.

The above example was then repeated with the sintering temperature being varied between 1300° and 1600° C, all the other conditions remaining the same. In each case, the product, as determined by X-ray analysis, was found to consist predominantly of the single phase ceramic material of the first example. Also the product was again found to contain a small amount of an unidentified phase.

In a first modification of the sixteenth example, the same procedure was repeated, but the nitriding temperature was now held just below 1300° C. In this case, although the product of the sintering reaction was found to contain the silicon aluminum oxynitride defined above together with a small percentage of an unidentified phase, the product also included free silicon nitride and free alumina.

In a second modification, the products of the sixteenth example and the first modification thereof were heated to 2000° C in graphite dies and then allowed to cool. The resultant materials were subjected to X-ray analysis and were found to consist entirely of the silicon aluminum oxynitride defined above, the unidentified phase being absent from each X-ray trace and no free alumina or silicon nitride being present in the material produced according to the first modification of the sixteenth example.

In a third modification, the procedure of the sixteenth example was again repeated, but this time the nitriding temperature was arranged to be in excess of 1600° C. The same single phase ceramic material defined above was found to be contained in the product of the sintering reaction, but the product was also found to include some aluminum silicate and aluminum nitride.

In a further modification of the sixteenth example, the silicon/alumina mixture was mixed with an acrylic dispersion in water to make a mixture of extrudable consistency. A green preform produced from the mixture was heated to drive off the water and burn off the acrylic dispersion. The porous product on heating in a nitrogen atmosphere at 1400° C was converted to a single phase Al — Si — N — O compound and having the expanded $\beta$-phase silicon nitride cell form.

The initial mixture of the above example together with a small quantity of an alginate deflocculating agent when tempered with additional water was found to have excellent slip casting properties, and a slip was cast by conventional slip casting techniques in a plaster-of-Paris mould to form a small crucible. The slip cast crucible was removed from the mould and placed in a nitrogen atmosphere. The temperature was increased from room temperature to 1400° C in 6 hours and held for six hours. A crucible containing predominantly the single phase compound containing Al — Si — N — O of the expanded $\beta$-phase cell form was produced. It will be appreciated that other means for mixing the silicon and alumina may be employed, for example the two materials could be flame-sprayed onto a release agent on a former, and the article so formed could then be removed and nitrided.

In a seventeenth example, the silicon and alumina powders of the sixteenth example were wet mixed in iso-propyl alcohol so that the relative atomic proportions of silicon to aluminum in the resultant mixture was 1 : 1. Subsequent processing of the mixture then proceeded as in the sixteenth example and, after nitridin at 1400° C, the resultant product was found to consist predominantly of the single phase silicon aluminum oxynitride. The product was, however, also found to contain a small percentage of an unidentified phase together with a small amount of free silicon nitride and a large amount of free alumina, such that the silicon aluminium oxynitride content was less than 90% of the ceramic phase. The product of the sintering reaction was buried in boron nitride powder in a graphite die and heated to 1700° C, whereafter an X-ray analysis was performed on the resultant material. The analysis showed that the material contained a small percentage of an unidentified phase, but consisted of at least 90% by volume of a single phase silicon aluminum oxynitride. This second sintering step was then repeated with a further product produced according to the seventeenth example, but in this case the heating within the boron nitride in the graphite die was performed at 2000° C. Again an X-ray examination of the resultant material was performed and in this case the material was found to consist entirely of a single phase silicon aluminum oxynitride, the unidentified phase being absent from the X-ray trace.

In a modification of the seventeenth example, the sintering temperature was arranged to be 1300° C and in this case the ceramic product was found to contain free alumina and free silicon nitride in addition to the silicon aluminium oxynitride produced in the sixteenth and seventeenth examples. Two samples of this product were then heated in boron nitride powder in a graphite die to 1700° C and 2000° C respectively and the effect of the heating operation investigated by X-ray analysis. In the case of the sample heated to 1700° C, the resultant product was found to consist substantially entirely of the single phase silicon aluminum oxynitride. A small amount of an unidentified phase was also present in this sample. However, with the sample which was heated to 2000° C, it was found that the product consisted entirely of the single phase silicon aluminum oxynitride.

In an eighteenth example the procedure of the sixteenth example was followed in which the silicon to aluminium atomic ratio was 1 : 3. As in the sixteenth example the two stage heating process was followed, but in this case the second heating step at 1700° C was performed with the product of the first heating step being embedded in boron nitride powder. The product was found to contain approximately 90% silicon aluminium oxynitride together with approximately 10% alumina.

In a nineteenth example the procedure of the eighteenth example was followed with the silicon to aluminium atomic ratio being 7 : 1, the product obtained being more than 90% silicon aluminium oxynitride.

It was observed in the sixteenth to nineteenth examples that with products subjected to temperatures of the order 1900° C to 2000° C the specimens evidenced some degree of surface degradation if unprotected at these temperatures. This difficulty was alleviated by embedding the samples in boron nitride powder although it will be appreciated that other protecting media such as silicon carbide powder or even gaseous media such as nitrogen of controlled partial pressure could have been used.

In the examples sixteen to nineteen, alumina has been used as the starting material. It will, however, be appreciated that as in the earlier examples, compounds of aluminium which decompose on heating so as to provide alumina at the nitriding temperature could have been employed.

In producing by the method of examples 16 to 19 a substantially single phase silicon aluminium oxynitride which obeys the general formula given above, it is desirable to ensure that the nitriding step is performed at temperatures less than 1600° C, but preferably above 1250° C, and more preferably between 1300° C and 1500° C and most preferably at about 1400° C. Also, for mixes where the silicon to aluminum atomic ratio is less than about 3 : 1, it is desirable to raise the temperature of the nitrided product above 1600° C and preferably above 1700° C.

While the examples 16 to 19 the product after the nitriding operation has been removed from the nitriding furnace, and heated to the higher temperature in a separate furnace, the complete heating cycle could be conducted within the nitriding furnace with the temperature being raised directly to the final sintering temperature. However, the rate of increase of temperature must be controlled such that the silicon nitride of the reaction does not decompose faster than the rate at which the silicon nitride reacts with the alumina. This is dependent upon many parameters including final temperature, particle size, bed geometry, bed density, heater configuration and nirtrogen potential.

Also, where an entirely single phase product is required, the nitriding step should be followed in all mixes by raising the temperature above 1700° C and more preferably above 1900° C, in particular to about 2000° C.

We claim:

1. A ceramic material consisting of at least 90% of a single phase silicon aluminum oxynitride having an increased cell dimensioned tetrahedral lattice of B-phase silicon nitride wherein the silicon has been partially replaced by aluminum and the nitrogen has been partially replaced by oxygen.

2. A method of producing a ceramic material comprising: mixing components consisting essentially of not more than 75% by weight of high active surface area alumina in powder form of particle size less than 10 microns, or a compound of aluminum which decomposes to give the required alumina at the elevated temperature of the process, with powdered silicon nitride of particle size less than 20 microns; surrounding the mixture with a protecting medium; and sintering the mixture at a temperature within the range of from 1600°C to 2000°C for at least 30 minutes, the silicon nitride and alumina combining at said temperatures to form a ceramic material consisting of a least 90% of a single phase silicon aluminum oxynitride consisting of a B-phase silicon nitride lattice having increased cell dimensions in which the silicon in the lattice has been partially replaced by aluminum and the nitrogen has been partially replaced by oxygen.

3. A method according to claim 2 wherein said sintering operation is accompanied by pressure.

4. The method according to claim 2 in which said alumina has a surface area at least 1 sq.m./gm.

5. The method according to claim 2, wherein said aluminium compound capable of decomposing to alumina at said elevated temperature is aluminium hydroxide or aluminium nitrate.

6. The method according to claim 2, wherein said silicon nitride powder is less than 5 microns particle size.

7. The method according to claim 6 in which said alumina powder is less than 1 micron particle size.

8. The method according to claim 7 in which said alumina is 0.5 microns particle size.

9. The method according to claim 2 in which the protecting medium is in powdered form.

10. The method according to claim 9 in which said protecting medium is powdered boron nitride.

11. The method according to claim 10 wherein said sintering temperature is greater than 1700° C.

12. The method according to claim 11 wherein said sintering temperature is greater than 1900° C.

13. The method according to claim 12 wherein said sintering temperature is 2000° C.

14. A method of producing a ceramic material including at least 90% of a single phase silicon aluminum oxynitride consisting of a β-phase silicon nitride lattice having increased cell dimensions in which the silicon in the lattice has been partially replaced by aluminum and the nitrogen has been partially replaced by oxygen, comprising heating a mixture containing silicon powder and alumina powder in a nitriding atmosphere and at a temperature greater than 1250° C and less than or equal to 1600° C, the powders having a particle size of less than 20 microns, and the relative proportions of the silicon and alumina in the mixture being such that the atomic ratio of the silicon to aluminum is greater than or equal to 3:1.

15. The method according to claim 14 in which the silicon is less than 5 microns particle size.

16. The method according to claim 14 in which the alumina is less than 1 micron particle size.

17. The method according to claim 14 in which the starting materials are cold pressed to shape before nitriding.

18. The method according to claim 15 14 in which the nitriding temperature is between 1300° C and 1500° C.

19. The method according to claim 18 in which the nitriding temperature is of the order 1400° C.

20. A method of producing a ceramic material including at least 90% of a single phase silicon aluminum oxynitride consisting of a β-phase silicon nitride lattice having increased cell dimensions in which the silicon in the lattice has been partially replaced by aluminum and the nitrogen has been partially replaced by oxygen, comprising heating a mixture containing silicon powder and alumina powder in a nitriding atmosphere and at a temperature greater than 1250° C and less than or equal to 1600° C, the powders having a particle size of less than 20 microns, and then raising the temperature above 1600° C with the preheated mixture being surrounded with a protective medium, the relative proportions of the silicon and alumina in the mixture being such that the atomic ratio of the silicon to aluminum is less than 3:1 down to 1:3.

21. The method according to claim 14 in which the nitriding step and the further heating step are conducted as a single stage heating process in the nitriding atmosphere.

22. The method according to claim 19 in which the further heating step is conducted in a separate furnace.

23. The method according to claim 22 wherein the protective medium is in powdered form.

24. The method according to claim 23 wherein the powdered protecting medium is boron nitride.

25. The method according to claim 19 wherein the further heating step is conducted at a temperature in excess of 1700° C.

26. The method according to claim 25 wherein said temperature is in excess of 1900° C.

27. The method according to claim 26 wherein said temperature is 2000° C.

* * * * *